US011230638B2

(12) United States Patent
Gahleitner et al.

(10) Patent No.: US 11,230,638 B2
(45) Date of Patent: Jan. 25, 2022

(54) HETEROPHASIC POLYPROPYLENE WITH PROPYLENE HEXENE RANDOM COPOLYMER AS MATRIX

(71) Applicant: BOREALIS AG, Vienna (AT)

(72) Inventors: Markus Gahleitner, Linz (AT); Jingbo Wang, Linz (AT); Klaus Bernreitner, Linz (AT); Pauli Leskinen, Porvoo (FI); Cornelia Tranninger, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/049,799

(22) PCT Filed: May 7, 2019

(86) PCT No.: PCT/EP2019/061692
§ 371 (c)(1),
(2) Date: Oct. 22, 2020

(87) PCT Pub. No.: WO2019/215159
PCT Pub. Date: Nov. 14, 2019

(65) Prior Publication Data
US 2021/0246290 A1  Aug. 12, 2021

(30) Foreign Application Priority Data

May 9, 2018 (EP) ..................... 18171587

(51) Int. Cl.
*C08L 23/14* (2006.01)
*C08J 5/18* (2006.01)

(52) U.S. Cl.
CPC ............. *C08L 23/142* (2013.01); *C08J 5/18* (2013.01); *C08J 2323/06* (2013.01); *C08J 2323/08* (2013.01); *C08J 2323/12* (2013.01); *C08J 2323/14* (2013.01); *C08J 2423/06* (2013.01); *C08J 2423/08* (2013.01); *C08J 2423/12* (2013.01); *C08J 2423/14* (2013.01); *C08L 2203/16* (2013.01); *C08L 2205/02* (2013.01); *C08L 2207/02* (2013.01)

(58) Field of Classification Search
CPC .................................................. C08L 23/142
USPC ......................................................... 524/400
See application file for complete search history.

(56) References Cited

FOREIGN PATENT DOCUMENTS

| CN | 105829437 A | 8/2016 |
| EP | 3064548 A1 | 9/2016 |
| RU | 2567750 C2 | 11/2015 |
| WO | 2001/092406 A1 | 12/2001 |
| WO | 2006/018812 A1 | 2/2006 |
| WO | 2006/114357 A | 11/2006 |
| WO | 2012/031953 A1 | 3/2012 |
| WO | 2012/084768 A1 | 6/2012 |
| WO | 2013/007650 A1 | 1/2013 |
| WO | 2015/011135 A | 1/2015 |
| WO | 2015089688 A1 | 6/2015 |
| WO | WO-2015089688 A1 * | 6/2015 | .............. C08L 23/12 |
| WO | 2015/150467 A1 | 10/2015 |
| WO | WO-2015150467 A1 * | 10/2015 | .............. C08L 23/14 |
| WO | WO-2017081018 A1 * | 5/2017 | .............. C08L 23/10 |

OTHER PUBLICATIONS

Plastic Additives Handbook 5th Edition Hans Zweifel, 2001.
Cheng, et al., "13C NMR Analysis of Ethylene-Propylene Rubbers", Macromolecules 17, 1984, 1950-1955.
International Report on Patentability, dated Apr. 1, 2020.
Extended European Search Report dated Oct. 1, 2018.
Filip, Xenia, et al, "Heteronuclear Decoupling Under Fast Mas by a Rotor-Synchronized Hahn-Echo Pulse Train", Journal of Magnetic Resonance 176 (2005) 239-243.
Griffin, John M., et al. "Low-Load Rotor-Synchronized Hahn-Echo Pulse Train (RS-HEPT) 1H Decoupling in Solid-State NMR:Factors Affecting Mas Spin-Echo Dephasing Times", Magn. Reson. Chem. 2007; 45:S198-S208.
Hans Zweifel Plastic Additives Handbook 6th edition 2009 pp. 1141-1190.
Klimke, Katja, et al., "Optimisation and Application of Polyolefin Branch Quantification by Melt-State 13CNMR Spectroscopy", Macromol. Chem. Phys. 2006, 207, p. 382-395.
Liu, Weixia, et al., "Poly(Ethylene-CO-1 -Octene)Characterization by High-Temperature Multidimensional NMR at 750 MHZ", Macromolecules 2001, 34, 4757-4767.
Busico, Vincenzo, et al., "ALK-1-ENE Polymerization in the Presence of a Monocyclopentadienyl Zirconium(IV) Acetamidinate Catalyst: Microstructural and Mechanistic Insights", Macromol. Rapid Commun. 2007, 28,1128-1137.
Hubner, Gerhard, et al., "Application of Melt-State NMR Spectroscopy for Poolyolefin Characterization in Industry", Chapter 24, Oct. 14, 2011.
Parkinson, Matthew, et al., "Effect of Branch Length on 13C NMR Relaztion Properties in Molten Poly[Ethylene-CO-(Alpha-Olefin)] Model Systems", Macromol. Chem. Phys. 2007, 208, 2128-133.
Pollard, M. Pollard, et al., "Observation of Chain Branching in Polyethylene in the Solid State and Melt Via 13C NMR Spectroscopy and Melt NMR Relation Time Measurements", Macromolecules 2004, 37, 813-825.

(Continued)

*Primary Examiner* — Deve V Hall
(74) *Attorney, Agent, or Firm* — Tarolli, Sundheim, Covell & Tummino LLP

(57) ABSTRACT

The present invention is directed to a heterophasic polypropylene composition of high transparency based on excellent compatibility of the propylene 1-hexene random copolymer used as matrix with different types of external modifiers dispersed within the matrix. The present invention is further directed to a process for producing such a polypropylene composition and to a film, in particular a cast film, obtained from such a polypropylene composition. The polypropylene composition comprising a blend of a propylene copolymer comprising 2.5 to 12.0 wt % of 1-hexene as a comonomer, and having a melt flow rate $MFR_2$ of 0.1 to 100 g/10 min, and an ethylene homo- or copolymer having a melt flow rate $MFR_2$ of 0.05 to 30.0 g/10 min and a density of 850 to 920 kg/m³, wherein the melt flow rate $MFR_2$ of the polypropylene composition is from 1.0 to 12.0 g/10 min.

13 Claims, No Drawings

(56) References Cited

OTHER PUBLICATIONS

Qiu, XiaoHua, et al., "Improved Peak Assignments for the 13C NMR Spectra of Poly(ethylene-co-1-octene)s", Macromolecules 2007, 40, 6879-6884.
Randall, James c., "A Review of High Resolution Liquid 13carbon Nuclear Magnetic Resonance Characterizations of Ethylene-Based Polymers", Journal of macromolecular science, C29( ):201 1989.
Resconi, Luigi, et al., "Selectivity in Propane Polymerization With Metallocene Catalysts", Chem. Rev. 2000, 100, 1253-1345.
Singh, Gurmeet, et al., "Triad Sequence Determination of Ethylene-Propylene Copolymers—Application of Quantitative 13C NMR", Polymer Testing 28 (2009) 475-479.
Wang, Wen-Jun, et al., "Structural Analysis of Ethylene/Propylene Copolymers Synthesized With a Constrained Geometry Catalyst", Macromolecules 2000, 33, 1157-1162.
Zhou, Zhe, et al., "A New Decoupling Method for Accurate Quantification of Polyethylene Copolymer Composition and Triad Sequence Distribution With 13C NMR", Journal of Magnetic Resonance 187 (2007) 225-233.
Castignolles, Patrice, et al., "Detection and quantification of branching in polyacrylates by size-exclusion chromotography (SEC) and melt-state 13C NMR Spectroscopy", Polymer 50 (2009) 2373-2383.
Applicant: Borealis AG; Russian Application No. 2020137957/04; Filed: May 7, 2019; Russian Office Action dated Jun. 3, 2021; 5 pgs.
Applicant: Borealis AG; Russian Application No. 2020137957/04; Filed: May 7, 2019; Russian Patent Search Report dated Jun. 3, 2021; 2 pgs.
Chinese Office Action for Applicaiton No. 201980025677.1; dated Sep. 3, 2021; 8 pgs.

\* cited by examiner

HETEROPHASIC POLYPROPYLENE WITH PROPYLENE HEXENE RANDOM COPOLYMER AS MATRIX

The present invention is directed to a heterophasic polypropylene composition of high transparency based on excellent compatibility of the propylene 1-hexene random copolymer used as matrix with different types of external modifiers dispersed within the matrix. The present invention is further directed to a process for producing such a polypropylene composition and to a film, in particular a cast film, obtained from such a polypropylene composition.

Heterophasic polypropylene compositions are known in the art. They are composed of a continuous propylene homopolymer and/or propylene random copolymer phase acting as matrix in which an elastomeric phase, e.g. an ethylene propylene rubber, is dispersed, the comonomer in the matrix being often ethylene. Depending on the particular design of the heterophasic polypropylene composition various property profiles can be established. Factors of influence are the constitution of the matrix phase, the constitution of the dispersed phase, and the relative amounts thereof. As indicated already above, the matrix can be a propylene homopolymer and/or a propylene random copolymer. For the dispersed phase there are several options considering e.g. the type of monomer/comonomer, the amount of comonomer, and the molecular weight.

Heterophasic polypropylene compositions were designed to provide improved impact properties if compared to propylene random copolymers. The improved impact strength of heterophasic polypropylene compositions is attributed to the presence of the dispersed phase.

It is, however, a difficult task to provide a polypropylene composition with sufficient impact properties and good optical properties since light scattering occurs on the interface between the continuous matrix phase and the dispersed elastomeric phase. Accordingly, heterophasic polypropylene compositions appear somewhat opaque.

Several attempts have been made to reduce light scattering at the interface and accordingly improve optical appearance. One way is to match the densities of the continuous matrix phase and the dispersed elastomeric phase as much as possible, resulting in similar refractive indices of the two phases. Another way is to modify the properties of the dispersed phase, e.g. by blending a heterophasic polypropylene with a specific polyethylene (PE) of specific density. The polyethylene is then part of the dispersed phase, i.e. together with an ethylene-propylene rubber (EPR), and the density of the entire dispersed phase (EPR+PE) can fit the density of the matrix phase and the optical properties an be accordingly good. However, such solutions need a rather complicated polymer design and the difficulties in plant scale are high. It is also possible to develop very fine dispersed phase particles by tuning the intrinsic viscosity of the elastomer forming the dispersed phase. The very fine dispersed phase particles do not cause light scattering, but also offer very limited impact properties.

WO 01/92406 A1 discloses a propylene polymer composition for extrusion blow molding of bottles produced with a Ziegler-Natta catalyst, having improved impact strength and excellent optical properties, wherein the propylene polymer composition comprises 70 to 90 wt % of a random copolymer of propylene with ethylene, containing from 1 to 6 wt % of ethylene, having a content of fraction insoluble in xylene at room temperature of not less than 93%, and from 10 to 30 wt % of a copolymer of propylene with ethylene, containing from 8 to 18 wt % of ethylene, having a melt flow rate $MFR_2$ (230° C., 2.16 kg) of from 0.5 to 50 g/10 min.

WO 2006/018812 A1 discloses a stretch blow molded container comprising a propylene polymer composition produced with a metallocene catalyst, having good processability and an improved balance of transparency and mechanical properties, wherein the propylene polymer composition comprises 25.0 to 75.0 wt % of a homopolymer or mini-random copolymer of propylene containing up to 1.0 wt % of at least one of ethylene and $C_4$-$C_{10}$ α-olefins, having an isotactic index greater than about 80%, and 25.0 to 75.0 wt % of a random copolymer of propylene and at least one olefin chosen from ethylene and $C_4$-$C_{10}$ α-olefins, containing about 0.3 to about 30 wt % of said olefin, and having an isotactic index greater than about 60%, wherein the propylene polymer composition has a melt flow rate of from 1 to 50 g/10 min and a molecular weight distribution of less than 3.5.

WO 2006/114357 A1 discloses a propylene polymer composition for thermoforming produced with a Ziegler-Natta catalyst, achieving articles having good mechanical and optical properties, wherein the propylene polymer composition comprises 60 to 90 wt % of a copolymer of propylene with ethylene containing less than 2.5 wt % of ethylene units, and 10 to 40 wt % of a copolymer of propylene comprising from 15 to 35 wt % of ethylene units, wherein the polymer composition has a melt flow rate value according to ISO 1133 (230° C., 2.16 kg) of less than 10 g/10 min.

WO 2012/084768 A1 discloses a propylene polymer composition for blow molding produced with a metallocene catalyst, wherein the blow molded articles, in particular collapsible bottles, can be sterilized at a temperature of 121° C., have low amount of extractables, and have good clarity without addition of nucleating or clarifying additives, wherein the propylene polymer composition comprises 60% to 90 wt % of a crystalline propylene copolymer containing from 1.0 to 5.0 wt % of ethylene derived units, and from 10 to 40 wt % of a copolymer of propylene with from 18 to 32 wt % of ethylene derived units, wherein the propylene polymer composition has a melt flow rate value according to ISO 1133 (230° C., 2.16 kg) of from 1.0 to 2.0 g/10 min.

The solutions according to the prior art are still not sufficient to fulfill the needs addressed above.

It is therefore an object of the present invention to provide a polypropylene composition with good optical properties, i.e. improved transparency, and sufficient impact strength for film applications.

The present invention is based on the finding that the object can be solved by provision of a heterophasic polypropylene composition comprising a blend of a propylene 1-hexene random copolymer and of an ethylene homo- or copolymer.

The present invention is accordingly in one aspect directed to a polypropylene composition comprising a blend of (a) a propylene copolymer comprising 2.5 to 12.0 wt %, based on the weight of the propylene copolymer, of 1-hexene as a comonomer, and having a melt flow rate $MFR_2$ of 0.1 to 100 g/10 min, and (b) an ethylene homo- or copolymer having a melt flow rate $MFR_2$ of 0.05 to 30.0 g/10 min and a density of 850 to 920 $kg/m^3$, wherein the melt flow rate $MFR_2$ of the polypropylene composition is from 1.0 to 12.0 g/10 min.

The polypropylene composition according to the present invention has sufficient impact properties and good optical properties.

Polypropylene Composition

Given the nature of components (a) and (b) of the blend of the polypropylene composition described above, the propylene copolymer (a) is a crystalline matrix with component (b) dispersed therein. The polypropylene composition according to the present invention is accordingly a heterophasic polypropylene composition.

According to a preferred embodiment of the polypropylene composition of the present invention, the blend comprises 60.0 to 95.0 wt %, based on the weight of the blend, of the propylene copolymer (a), and 5.0 to 40.0 wt %, based on the weight of the blend, of the ethylene homo- or copolymer (b).

The amount of the propylene copolymer (a) is accordingly preferably 60.0 to 95.0 wt %, based on the weight of the blend, more preferably 65.0 to 93.0 wt %, even more preferably 70.0 to 92.0 wt %.

The amount of the ethylene homo- or copolymer (b) is accordingly preferably 5.0 to 40.0 wt %, based on the weight of the blend, more preferably 7.0 to 35.0 wt %, even more preferably 8.0 to 30.0 wt %.

As indicated above, the melt flow rate $MFR_2$ of the polypropylene composition of the present invention is from 1.0 to 12.0 g/10 min (230° C., 2.16 kg), preferably from 1.5 to 10.0 g/10 min, more preferably from 1.8 to 8.0 g/10 min.

The haze of the polypropylene composition of the present invention, as measured on injection molded plaques of 1 mm thickness, is preferably lower than 45.0%, more preferably lower than 43.0%. In this regard it is further preferred that the haze of the polypropylene composition of the present invention is lower than the haze of the propylene copolymer (a).

The Charpy notched impact strength of the polypropylene composition of the present invention is preferably higher than 5.0 (23° C.).

The absolute value of the density difference between the propylene copolymer (a) and the ethylene homo- or copolymer (b) is preferably not higher than 60.0 kg/m$^3$, like not higher than 50.0 kg/m$^3$ or not higher than 45.0 kg/m$^3$.

The xylene cold solubles (XCS) content of the polyolefin composition of the present invention is preferably in the range of 1.0 to 40.0 wt %, more preferably in the range of 1.2 to 38.0 wt %.

The polypropylene composition according to the present invention has preferably two melting temperatures wherein one of those can be attributed to the ethylene homo- or copolymer (b) ($T_m(1,PE)$), the other one to the propylene copolymer (a) ($T_m(2,PP)$).

$T_m(1,PE)$ is preferably below 130° C., more preferably below 120° C., like below 115° C. A reasonable lower limit for $T_m(1,PE)$ is 40.0° C.

$T_m(2,PP)$ is preferably at least 130° C., more preferably at least 132° C., like at least 134° C. A reasonable upper limit for $T_m(2,PP)$ is 150° C.

The crystallization temperature $T_c$ of the polyolefin composition according to the present invention is preferably below 100° C., more preferably in the range of 85.0 to 98.0° C.

The polypropylene composition according to the present invention has preferably two destinct glass transitions temperatures $T_g$ wherein one of those can be attributed to the propylene copolymer (a) ($T_g(1,PP)$), the other one to the ethylene homo- or copolymer (b) ($T_g(2,PE)$).

$T_g(1,PP)$ is preferably in the range of −1.0 to 5.0° C., like in the range of 0.0 to 4.0° C.

$T_g(2,PE)$ is preferably in the range of −65.0 to −25.0° C., like in the range of −62.0 to −28.0° C.

The content of 1-hexene of the polyolefin composition according to the present invention is preferably in the range of 2.0 to 7.0 wt %, more preferably in the range of 2.2 to 6.0 wt %.

The flexural modulus of the polypropylene composition according to the present invention is preferably below 800 MPa, like in the range of 300 to 700 MPa.

Preferably, the blend makes up at least 90.0 wt %, more preferably at least 95.0 wt %, like 98.0 wt % or 100 wt %, of the polypropylene composition of the present invention.

The polypropylene composition according to the present invention may optionally comprise from 0.001 to 0.50 wt % of an α-nucleating agent. Such α-nucleating agents are commercially available and are described, for example, in "Plastic Additives Handbook", 5th edition, 2001 of Hans Zweifel (pages 949 to 964).

The polypropylene composition according to the present invention may optionally comprise usual additives in an amount of below 10.0 wt %, like below 5.0 wt %. Additives are suitably selected from the group of primary antioxidants like sterically hindered phenols and secondary antioxidants like phosphites, UV stabilizers like sterically hindered amines, acid scavengers, carbon black, pigment, antistatic agents like glycerol monostearate, slip agents like oleamide, plasticizers, anti-scratch agents, dispersing agents, processing aids, lubricants, and the like.

Such additives are commercially available and for example described in "Plastic Additives Handbook", 6th edition 2009 of Hans Zweifel (pages 1141 to 1190) and typically used in conventional amounts.

In case present, the α-nucleating agent and/or any of the usual additives may be comprised in the propylene copolymer (a) and/or in the ethylene homo- or copolymer (b), or may be added in the step of compounding for obtaining the polypropylene composition.

In case any α-nucleating agent and/or any of the usual additives is added in the step of compounding, the addition of the α-nucleating agent and/or any of the usual additives is usually carried out in the form of a masterbatch, i.e. the α-nucleating agent and/or any of the usual additives is contained in a suitable polyolefin carrier, e.g. polyethylene or polypropylene, in high concentration. The propylene copolymer (a), the ethylene homo- or copolymer (b), and optionally one or more masterbatches containing a α-nucleating agent and/or one or more usual additives are compounded to obtain the polypropylene composition.

Propylene Copolymer (a)

The propylene copolymer (a) comprises 2.5 to 12.0 wt %, preferably 2.8 to 8.0 wt %, more preferably 3.0 to 6.5 wt %, based on the weight of the propylene copolymer (a), of 1-hexene as a comonomer.

The propylene copolymer (a) may optionally in addition comprise 0.1 to 3.0 wt %, based on the weight of the propylene copolymer (a), of ethylene as a comonomer.

The propylene copolymer (a) has a melt flow rate $MFR_2$ of 0.1 to 100 g/10 min (230° C., 2.16 kg), like 0.2 to 50.0 g/10 min or 0.5 to 20.0 g/10 min.

The propylene copolymer (a) has preferably a density of 890 to 910 kg/m$^3$.

The skilled person knows how to produce a propylene copolymer (a) according to the present invention, i.e. a propylene 1-hexene copolymer or a propylene 1-hexene ethylene terpolymer, or a reactor blend of a propylene 1-hexene copolymer and a propylene ethylene copolymer.

Polymerization may be carried out for example in a loop reactor, in a pas phase reactor or in a combination of both, in the presence of a suitable catalyst like a Ziegler-Natta catalyst or a single site catalyst, e.g. a metallocene catalyst.

The propylene copolymer (a) may comprise two propylene copolymer fractions produced in two different polymerization steps, wherein the first fraction has a lower melt flow rate $MFR_2$ than the second fraction, and wherein the polymerization step for obtaining the second fraction is carried out in the presence of the first fraction. Hence, the melt flow rate $MFR_2$ of the product obtained from the polymerization step for obtaining the second fraction, containing also the first fraction, has a higher melt flow rate $MFR_2$ than the first fraction. The melt flow rate $MFR_2$ of the first fraction is usually 0.1 to 10.0 g/10 min.

In an embodiment as described above, wherein the propylene copolymer (a) comprises two propylene copolymer fractions produced in two different polymerization steps, it is further preferred that the content of 1-hexene of the first fraction is lower than the content of 1-hexene of the second fraction. The content of 1-hexene of the first fraction is usually 1.0 to 6.0 wt %, like 1.0 to 3.0 wt %. The content of 1-hexene of the second fraction is usually 3.0 to 10.0 wt %, like 3.5 to 10.0 wt %.

It is preferred, that in an embodiment as described above, wherein the propylene copolymer (a) comprises two propylene copolymer fractions produced in two different polymerization steps, the first fraction has a lower melt flow rate $MFR_2$ and has a lower content of 1-hexene than the second fraction. In this regard it is further preferred that the first fraction is polymerized in a loop reactor, while the second fraction is polymerized in a gas phase reactor in the presence of the product obtained from the loop reactor, i.e. the first fraction.

In an embodiment as described above, wherein the propylene copolymer (a) comprises two propylene copolymer fractions produced in two different polymerization steps, the split between the two reactors is usually 30.0 to 70.0 wt % for the first fraction, preferably prepared in a loop reactor, and accordingly correspondingly 70.0 to 30. wt % for the second fraction, preferably prepared in a gas phase reactor.

The use of a single site catalyst is preferred. The single-site catalyst is preferably a metallocene catalyst with the metal being Zr or Hf, and the ligand being based on two 4-phenylindene moieties being linked by the moiety —$SiR_2$—, wherein each R is independently a $C_1$-$C_{20}$-hydrocarbyl group or tri($C_1$-$C_{20}$-alkyl)silyl.

Ethylene Homo- or Copolymer (b)

The ethylene homo- or copolymer has a melt flow rate $MFR_2$ of 0.05 to 30.0 g/10 min (190° C., 2.16 kg), preferably 0.1 to 25.0 g/10 min, like 0.2 to 20.0 g/10 min.

The ethylene homo- or copolymer has a density in the range of 850 to 920 kg/m$^3$.

Given the density range defined above, in case the ethylene homo- or copolymer (b) is an ethylene homopolymer, it is a so-called low density polyethylene, LDPE. The skilled person knows how to produce such LDPE in a high pressure process without applying a catalyst. Suitable LDPE grades are also commercially available.

In case the ethylene homo- or copolymer (b) is an ethylene copolymer, it is a copolymer of ethylene and a $C_4$ to $C_{12}$ α-olefin, preferably it is an ethylene 1-octene copolymer. The skilled person knows how to produce such ethylene copolymers, often referred to as linear low density polyethylene, LLDPE and very low density polyethylene, VLDPE. Polymerization may be carried out for example in a loop reactor, in a pas phase reactor or in a combination of both, in the presence of a suitable catalyst like a Ziegler-Natta catalyst or a single site catalyst, e.g. a metallocene catalyst.

Such a copolymer of ethylene and a $C_4$ to $C_{12}$ α-olefin preferably has a comonomer content of not higher than 17.0 mol %, more preferably of not higher than 12.0 mol %.

The comonomer content will be usually at least 2.0 mol %.

In case the comonomer is 1-octene, the content of 1-octene is preferably not higher than 45.0 wt %, more preferably not higher than 35.0 wt %. The content of 1-octene will be usually at least 8.0 wt %.

Films

The present invention is in a further aspect directed to a film comprising, more preferably comprising at least 80.0 wt %, yet more preferably comprising at least 95.0 wt %, still more preferably consisting of, the polypropylene composition according to the present invention as described above, including all preferred embodiments thereof.

The film is preferably a cast film.

The film of the present invention can be a monolayer or a multilayer film.

The thickness of the film is not critical but will be usually 20.0 to 200 μm.

The monolayer film of the present invention comprises at least 80.0 wt %, preferably at least 95.0 wt %, more preferably consists, of the polypropylene composition of the present invention.

Typical thickness of the monolayer film of the present invention is 20.0 to 200 μm, like 20.0 to 100 μm.

The multilayer film of the present invention comprises at least one layer comprising the polypropylene composition of the present invention. Said layer(s) of the multilayer film comprising the polypropylene composition according to the present invention as described above can be any layer(s), e.g. core or outer layer(s). The thickness of a layer of a multilayer film, the respective layer comprising the polypropylene composition according to the present invention as described above, can vary between 1.0 and 200 μm, like 1.0 and 190 μm, depending on the function of the layer, i.e. whether the layer functions e.g. as outer layer (skin layer) or as core layer, and is selected accordingly, as well known for a skilled person. For instance, an outer layer can have a thickness of 2.0 to 3.0 μm, and the thickness of a core layer can e.g. be 20.0 to 200 μm, such as 20.0 to 100 μm.

The at least one layer of the multilayer film of the present invention comprises at least 80.0 wt %, preferably at least 95.0 wt %, preferably consists, of the polypropylene composition of the present invention.

The film, preferably the cast film, according to the present invention may be conventionally prepared by extruding the polypropylene composition of the present invention, i.e. a pre-obtained melt-mix thereof, through a die with dimensions as desired for the end film application, as well known in the art.

Immediately after exiting the die at the extrusion step the molten film enters a cooling step where its temperature is lowered to solidify the film.

The cooling step is normally performed rather quick, i.e. at rather low cooling temperature, since otherwise the obtained films are hazy. In case the film is a cast film, the cooling step of the extruded film is effected by a chill roll.

The processes for producing films from polypropylene compositions, in particular for producing cast films, are described in the literature and belong to the knowledge of a skilled person.

Process for Producing the Polypropylene Composition

The present invention is in a further aspect directed to a process for preparing a polypropylene composition according to the present invention as described above, including all preferred embodiments thereof, comprising the following steps:

(i) polymerising propylene and 1-hexene, and optionally ethylene, in the presence of a single-site catalyst to obtain a fraction (a) having a content of 1-hexene of 2.5 to 12.0 wt %, and optionally a content of ethylene of 0.1 to 3.0 wt %, and having a melt flow rate $MFR_2$ of 0.1 to 100 g/10 min (230° C., 2.16 kg), and (ii) polymerising ethylene, or ethylene and a $C_4$ to $C_{12}$ α-olefin, to obtain a fraction (b) having a melt flow rate $MFR_2$ of 0.05 to 30.0 g/10 min (190° C., 2.16 kg) and a density of 850 to 920 kg/m$^3$.

The polymerization step (i) is usually carried out in the absence of fraction (b) and the polymerization step (ii) is carried out in the absence of fraction (a), and fraction (a) and fraction (b) are mixed by compounding to obtain the blend.

In the following the present invention is further illustrated by means of examples.

EXAMPLES

1. Definitions/Measuring Methods

The following definitions of terms and determination methods apply for the above general description of the invention as well as to the below examples unless otherwise defined.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene (polypropylene composition of the present invention and propylene copolymer (a)) is determined at a temperature of 230° C. and a load of 2.16 kg. The $MFR_2$ of polyethylene (ethylene homo- or copolymer (b)) is determined at a temperature of 190° C. and a load of 2.16 kg.

Comonomer Content (1-hexene in Component (a))

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382, Parkinson, M., Klimke, K., Spiess, H. W., Wilhelm, M., Macromol. Chem. Phys. 2007; 208:2128, Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H. W., Wilhelm, M., Macromol. Chem. Phys. 2006; 207: 382, Pollard, M., Klimke, K., Graf, R., Spiess, H. W., Wilhelm, M., Sperber, O., Piel, C., Kaminsky, W., Macromolecules 2004; 37:813). and the RS-HEPT decoupling scheme (Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 200745, S1, S198). A total of 16384 (16 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H = I\alpha B4/2$$

The amount of 1-hexene incorporated in PHHP double consecutive sequences was quantified using the integral of the ααB4 site at 41.7 ppm accounting for the number of reporting sites per comonomer:

$$HH = 2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H = (I\alpha B4 - 2*I\alpha\alpha B4)/2$$

The total 1-hexene content was calculated based on the sum of isolated and consecutively incorporated 1-hexene:

$$H\text{total} = H + HH$$

When no sites indicative of consecutive incorporation observed the total 1-hexene comonomer content was calculated solely on this quantity:

$$H\text{total} = H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21 = I\alpha\alpha 21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_S\alpha\alpha + 2*P21 + H + HH/2$$

The total amount of propene was quantified as the sum of primary (1,2) and secondary (2,1-erythro) inserted propene:

$$P\text{total} = P12 + P21 = I_S\alpha\alpha + 3*I\alpha\alpha 21e9 + (I\alpha B4 - 2*I\alpha\alpha B4)/2 + I\alpha\alpha B4$$

This simplifies to:

$$P\text{total} = I_S\alpha\alpha + 3*I\alpha\alpha 21e9 + 0.5*I\alpha B4$$

The total mole fraction of 1-hexene in the polymer was then calculated as:

$$fH = H\text{total}/(H\text{total} + P\text{total})$$

The full integral equation for the mole fraction of 1-hexene in the polymer was:

$$fH = (((I\alpha B4 - 2*I\alpha\alpha B4)/2) + (2*I\alpha\alpha B4))/((I_S\alpha\alpha + 3*I\alpha\alpha 21e9 + 0.5*I\alpha B4) + ((I\alpha B4 - 2*I\alpha\alpha B4)/2) + (2*I\alpha\alpha B4))$$

This simplifies to:

$$fH = (I\alpha B4/2 + I\alpha\alpha B4)/(I_S\alpha\alpha + 3*I\alpha\alpha 21e9 + I\alpha B4 + I\alpha\alpha B4)$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16) + ((1 - fH)*42.08))$$

Comonomer Content (Ethylene in Component (a))

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate $(Cr(acac)_3)$ resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 331157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 331157, through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

Comonomer Content (1-octene in Component (b))

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382; Parkinson, M., Klimke, K., Spiess, H. W., Wilhelm, M., Macromol. Chem. Phys. 2007; 208:2128; Castignolles, P., Graf, R., Parkinson, M., Wilhelm, M., Gaborieau, M., Polymer 50 (2009) 2373; NMR Spectroscopy of Polymers: Innovative Strategies for Complex Macromolecules, Chapter 24, 401 (2011)). Standard single-pulse excitation was employed utilising the transient NOE at short recycle delays of 3 s (Pollard, M., Klimke, K., Graf, R., Spiess, H. W., Wilhelm, M., Sperber, O., Piel, C., Kaminsky, W., Macromolecules 2004; 37:813; Klimke, K., Parkinson, M., Piel, C., Kaminsky, W., Spiess, H. W., Wilhelm, M., Macromol. Chem. Phys. 2006; 207:382) and the RS-HEPT decoupling scheme (Filip, X., Tripon, C., Filip, C., J. Mag. Resn. 2005, 176, 239; Griffin, J. M., Tripon, C., Samoson, A., Filip, C., and Brown, S. P., Mag. Res. in Chem. 200745, S1, S198). A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201). Characteristic signals corresponding to the incorporation of 1-octene were observed (J. Randall, Macromol. Sci., Rev. Macromol. Chem. Phys. 1989, C29, 201; Liu, W., Rinaldi, P., McIntosh, L., Quirk, P., Macromolecules 2001, 34, 4757; Qiu, X., Redwine, D., Gobbi, G., Nuamthanom, A., Rinaldi, P., Macromolecules 2007, 40, 6879) and all comonomer contents calculated with respect to all other monomers present in the polymer.

Characteristic signals resulting from isolated 1-octene incorporation i.e. EEOEE comonomer sequences, were observed. Isolated 1-octene incorporation was quantified using the integral of the signal at 38.37 ppm. This integral is assigned to the unresolved signals corresponding to both *B6 and *βB6B6 sites of isolated (EEOEE) and isolated double non-consecutive (EEOEOEE) 1-octene sequences respectively. To compensate for the influence of the two *βB6B6 sites the integral of the ββB6B6 site at 24.7 ppm is used:

$$O = I_{*B6+*\beta B6B6} - 2*I_{\beta\beta B6B6}$$

Characteristic signals resulting from consecutive 1-octene incorporation, i.e. EEOOEE comonomer sequences, were also observed. Such consecutive 1-octene incorporation was quantified using the integral of the signal at 40.57 ppm assigned to the ααB6B6 sites accounting for the number of reporting sites per comonomer:

$$OO = 2*I_{\alpha\alpha B6B6}$$

Characteristic signals resulting from isolated non-consecutive 1-octene incorporation, i.e. EEOEOEE comonomer sequences, were also observed. Such isolated non-consecutive 1-octene incorporation was quantified using the integral of the signal at 24.7 ppm assigned to the ββB6B6 sites accounting for the number of reporting sites per comonomer:

$$OEO = 2*I_{\beta\beta B6B6}$$

Characteristic signals resulting from isolated triple-consecutive 1-octene incorporation, i.e. EEOOOEE comonomer sequences, were also observed. Such isolated triple-consecutive 1-octene incorporation was quantified using the integral of the signal at 41.2 ppm assigned to the ααγB6B6B6 sites accounting for the number of reporting sites per comonomer:

$$OOO = 3/2*I_{\alpha\alpha\gamma B6B6B6}$$

With no other signals indicative of other comonomer sequences observed the total 1-octene comonomer content was calculated based solely on the amount of isolated (EEOEE), isolated double-consecutive (EEOOEE), isolated non-consecutive (EEOEOEE) and isolated triple-consecutive (EEOOOEE) 1-octene comonomer sequences:

$$O_{total} = O + OO + OEO + OOO$$

Characteristic signals resulting from saturated end-groups were observed. Such saturated end-groups were quantified using the average integral of the two resolved signals at 22.84 and 32.23 ppm. The 22.84 ppm integral is assigned to the unresolved signals corresponding to both 2B6 and 2S sites of 1-octene and the saturated chain end respectively. The 32.23 ppm integral is assigned to the unresolved signals corresponding to both 3B6 and 3S sites of 1-octene and the saturated chain end respectively. To compensate for the influence of the 2B6 and 3B6 1-octene sites the total 1-octene content is used:

$$S = (\tfrac{1}{2})*(I_{2S+2B6} + I_{3S+3B6} - 2*O_{total})$$

The ethylene comonomer content was quantified using the integral of the bulk methylene (bulk) signals at 30.00 ppm. This integral included the γ and 4B6 sites from 1-octene as well as the δ+ sites. The total ethylene comonomer content was calculated based on the bulk integral and compensating for the observed 1-octene sequences and end-groups:

$$E_{total} = (\tfrac{1}{2})*[I_{bulk} + 2*O + 1*OO + 3*OEO + 0*OOO + 3*S]$$

It should be noted that compensation of the bulk integral for the presence of isolated triple-incorporation (EEOOOEE) 1-octene sequences is not required as the number of under and over accounted ethylene units is equal.

The total mole fraction of 1-octene in the polymer was then calculated as:

$$fO = (O_{total})/(E_{total} + O_{total})$$

The total comonomer incorporation of 1-octene in mol percent was calculated from the mole fraction in the standard manner:

$$O[\text{mol \%}] = 100*fO$$

The mole percent ethylene incorporation was calculated from the formula:

$$E[\text{mol \%}] = 100 - O[\text{mol \%}].$$

Density

Density is measured according to ISO 1183-187. Sample preparation is done by compression moulding in accordance with ISO 1872-2:2007.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy ($H_m$) are determined from the second heating step.

Xylene Cold Soluble (XCS) Content

Xylene Cold Soluble fraction at room temperature (XCS, wt %) is determined at 25° C. according to ISO 16152; 5th edition; 2005 Jul. 1.

Dynamic Mechanical Thermal Analysis (DMTA)

The glass transition temperature $T_g$ is determined by dynamic mechanical thermal analysis (DMTA) according to ISO 6721-7. The measurements are done in torsion mode on compression moulded samples (40×10×1 mm³) between −100° C. and +150° C. with a heating rate of 2° C./min and a frequency of 1 Hz. Storage modulus G' is determined at +23° C. according ISO 6721-7:1996. The measurements are done in torsion mode on compression moulded samples (40×10×1 mm³) between −150° C. and +150° C. with a heating rate of 2° C./min and a frequency of 1 Hz.

Flexural Modulus

The flexural modulus was determined in 3-point-bending at 23° C. according to ISO 178 on 80×10×4 mm³ test bars injection moulded in line with EN ISO 1873-2.

Notched Impact Strength (NIS)

The Charpy notched impact strength (NIS) was measured according to ISO 1791eA at +23° C., using injection moulded bar test specimens of 80×10×4 mm³ prepared in accordance with EN ISO 1873-2.

Haze

Haze was determined according to ASTM D1003-00 on 60×60×1 mm³ plaques injection moulded in line with EN ISO 1873-2. Hence, haze is determined on 1 mm thick plaques.

2. Examples

Preparation of the Catalyst System for the Inventive Examples

The catalyst used in the inventive examples is prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO 2015/011135 A1) is prepared as described in WO 2013/007650 A1 (metallocene E2 in WO 2013/007650 A1).

Polymerization and Pelletization

Polymers P1 and P2 are produced in a Borstar pilot plant comprising a prepolymerisation reactor, a loop reactor and a gas phase reactor. The polymerisation conditions are indicated in Table 1. P1 is the basis of Inventive Examples 1 to 4, IE1-IE4. P2 is the basis of Inventive Examples 5 and 6, IE5 and IE6.

Both polymers P1 and P2 were compounded in a co-rotating twin-screw extruder Coperion ZSK 57 at 220° C. with 0.2 wt % of Irganox B225 (1:1-blend of Irganox 1010 (Pentaerythrityl-5 tetrakis(3-(3',5'-di-tert.butyl-4-hydroxy-toluyl)-propionate and tris (2,4-di-t-butylphenyl) phosphate) phosphite) of BASF AG, Germany) and 0.1 wt % calcium stearate followed by solidification of the resulting melt strands in a water bath and pelletization.

Compounding

All further melt mixing was performed in a Thermo Fisher (PRISM) TSE 24 twin-screw extruder at 220° C. followed by solidification of the resulting melt strands in a water bath and pelletization.

The polypropylene composition of IE1 is obtained by mixing P1 with 25 wt % of CA9159, a low-density polyethylene commercially available from Borealis AG, Austria, having a density (ISO 1183) of 915 kg/m$^3$, and a melt flow rate at 190° C. with a load of 2.16 kg (ISO 1133) of 15 g/10 min.

The polypropylene composition of IE2 is obtained by mixing P1 with 25 wt % of Queo™ 0201, an ethylene based 1-octene plastomer commercially available from Borealis AG, Austria, having a density (ISO 1183) of 902 kg/m$^3$, and a melt flow rate at 190° C. with a load of 2.16 kg (ISO 1133) of 1.1 g/10 min.

The polypropylene composition of IE3 is obtained by mixing P1 with 25 wt % of Queo™ 8201, an ethylene based 1-octene plastomer commercially available from Borealis AG, Austria, having a density (ISO 1183) of 883 kg/m$^3$, and a melt flow rate at 190° C. with a load of 2.16 kg (ISO 1133) of 1.1 g/10 min.

The polypropylene composition of IE4 is obtained by mixing P1 with 25 wt % of Engage™ 8180, an ethylene octene copolymer commercially available from Dow, having a density (ASTM D792) of 863 kg/m$^3$, and a melt flow rate at 190° C. with a load of 2.16 kg (ASTM D1238) of 0.5 g/10 min.

The polypropylene composition of IE5 is obtained by mixing P2 with 25 wt % of Engage™ 8180 as defined above in connection with IE4.

The polypropylene composition of IE6 is obtained by mixing P2 with 25 wt % of CA9159 as defined above in connection with IE1.

The polypropylene composition of CE1 is based on 100 wt % P1.

The polypropylene composition of CE2 is based on 100 wt % P2.

The properties of the the inventive and comparative examples are shown in Tables 2 and 3.

TABLE 1

Polymerisation details of polymers P1 and P2

|  |  | P1 | P2 |
|---|---|---|---|
| Prepolymerization | | | |
| Temperature | ° C. | 20 | 20 |
| Pressure | kPa | 5023 | 5247 |
| Residence time | h | 0.5 | 0.4 |
| Loop reactor | | | |
| Temperature | ° C. | 70 | 70 |
| Pressure | kPa | 5244 | 5241 |
| H2/C3 ratio | mol/kmol | 0.1 | 0.1 |
| C6/C3 ratio | mol/kmol | 8.2 | 7.2 |
| Residence time | h | 0.4 | 0.4 |
| C6 | wt % | 1.4 | 1.3 |
| MFR | g/10 min | 1.4 | 1.1 |
| Split | wt % | 45 | 41 |
| Gas phase reactor | | | |
| Temperature | ° C. | 80 | 80 |
| Pressure | kPa | 2500 | 2500 |
| H2/C3 ratio | mol/kmol | 1.5 | 1.7 |
| C6/C3 ratio | mol/kmol | 9.0 | 7.0 |
| C6(GPR) | wt % | 7.9 | 4.5 |
| MFR(GPR) | g/10 min | 1.4 | 1.9 |
| Residence time | h | 0.4 | 1.8 |
| Split | wt % | 55 | 59 |
| Product | | | |
| C6 total | wt % | 5.0 | 3.2 |
| XCS | wt % | 11.1 | 0.7 |
| MFR | g/10 min | 1.4 | 1.5 |
| Density | kg/m$^3$ | 898 | 896 |

TABLE 2

Properties of inventive and comparative examples based on P1

|  |  | IE1 | IE2 | IE3 | IE4 | CE1 |
|---|---|---|---|---|---|---|
| MFR | g/10 min | 4.9 | 2.3 | 2.2 | 2.4 | 1.4 |
| T$_m$(1) | ° C. | 105 | 98 | 77 | — | — |
| T$_m$(2) | ° C. | 140 | 140 | 140 | 140 | 139 |
| H$_m$(1) | J/g | 39 | 28 | 8 | — | — |
| H$_m$(2) | J/g | 34 | 36 | 40 | 54 | 71 |
| T$_c$ | ° C. | 91 | 90 | 90 | 91 | 91 |
| XCS | wt % | 8.9 | 10.7 | 31.3 | 33.1 | 11.1 |
| T$_g$(1) | ° C. | 2.3 | 2.3 | 2.3 | 1.9 | 2.3 |
| T$_g$(2) | ° C. | −33 | −40 | −47 | −58 | — |
| G' (23° C.) | MPa | 327 | 286 | 266 | 259 | 391 |
| Flexural modulus | MPa | 582 | 520 | 461 | 415 | 712 |
| Charpy NIS 23° C. | kJ/m$^2$ | 6.3 | 32.5 | 71.3 | 78.3 | 5.9 |
| Charpy NIS −20° C. | kJ/m$^2$ | 1.48 | 2.28 | 3.5 | 4.4 | — |
| Δ density (abs.) | kg/m$^3$ | 19 | 6 | 13 | 33 | — |
| Haze 1 mm | % | 31 | 12 | 18 | 27 | 43 |

TABLE 3

Properties of inventive and comparative examples based on P2

|  |  | IE5 | IE6 | CE2 |
|---|---|---|---|---|
| MFR | g/10 min | 5.9 | 5.1 | 1.5 |
| T$_m$(1) | ° C. | 54 | 104 | — |
| T$_m$(2) | ° C. | 136 | 136 | 136 |
| H$_m$(1) | J/g | 2 | 35 | — |
| H$_m$(2) | J/g | 54 | 41 | 77 |
| T$_c$ | ° C. | 95 | 93 | 94 |
| XCS | wt % | 27.0 | 1.7 | 0.5 |
| T$_g$(1) | ° C. | 2.3 | 3.2 | 2.5 |
| T$_g$(2) | ° C. | −58 | −33 | — |
| G' (23° C.) | MPa | 305 | 378 | 457 |
| Flexural modulus | MPa | 516 | 685 | 853 |
| Charpy NIS 23° C. | kJ/m$^2$ | 63.8 | 6.6 | 5.0 |
| Charpy NIS −20° C. | kJ/m$^2$ | 3.9 | 1.64 | — |
| Δ density (abs.) | kg/m$^3$ | 35 | 17 | — |
| Haze 1 mm | % | 42 | 32 | 55 |

As can be seen from the examples, the propylene copolymer (a) comprising 1-hexene as comonomer is an excellent matrix for making transparent heterophasic polypropylene compositions. It has excellent compatibility with different types of ethylene homo- or copolymers, here LDPE and ethylene 1-octene copolymers, even if the density mismatch between the matrix and the dispersed phase is higher and by no means ideal in accordance with literature in his area. Further on, it was believed that ethylene 1-octene copolymers (plastomers) are generally detrimental for transparency in contrast to the usually used propylene ethylene copolymers (plastomers), e.g. those commercially available under the tradename Vistamaxx™. This is apparently not the case in connection with a propylene copolymer (a) as described in the present invention.

The invention claimed is:

1. A polypropylene composition comprising a blend of:
    (a) a propylene copolymer comprising 2.5 to 12.0 wt %, based on the weight of the propylene copolymer, of 1-hexene as a comonomer, and having a melt flow rate $MFR_2$ of 0.1 to 100 g/10 min as determined at a temperature of 230° C. and a load of 2.16 kg, and
    (b) an ethylene homo- or copolymer having a melt flow rate $MFR_2$ of 0.05 to 30.0 g/10 min as determined at a temperature of 190° C. and a load of 2.16 kg and a density of 850 to 920 kg/m$^3$, wherein the ethylene copolymer comprised by the ethylene homo- or copolymer is an ethylene 1-octene copolymer
    wherein the melt flow rate $MFR_2$ of the polypropylene composition is from 1.0 to 12.0 g/10 min as determined at a temperature of 230° C. and a load of 2.16 kg.

2. The polypropylene composition according to claim 1, wherein the blend comprises 60.0 to 95.0 wt %, based on the weight of the blend, of the propylene copolymer (a), and 5.0 to 40.0 wt %, based on the weight of the blend, of the ethylene homo- or copolymer (b).

3. The polypropylene composition according to claim 1, wherein the haze of the polypropylene composition is lower than 45.0% as determined on 1 mm$^3$ injection moulded plaques.

4. The polypropylene composition according to claim 1, wherein the haze of the polypropylene composition is lower than the haze of the propylene copolymer (a).

5. The polypropylene composition according to claim 1, wherein the propylene copolymer (a) comprises in addition 0.1 to 3.0 wt %, based on the weight of the propylene copolymer, of ethylene as a comonomer.

6. The polypropylene composition according to claim 1, wherein the ethylene copolymer comprised by the ethylene homo- or copolymer (b) has a comonomer content of not higher than 17.0 mol %.

7. The polypropylene composition according to claim 1, wherein the content of 1-hexene of the polypropylene composition is 2.0 to 7.0 wt %.

8. The polypropylene composition according to claim 1, further comprising from 0.001 to 0.50 wt % of an α-nucleating agent.

9. The polypropylene composition according to claim 1, wherein the propylene copolymer (a) comprises two propylene copolymer fractions produced in two different polymerization steps, wherein the first fraction has a lower melt flow rate $MFR_2$ than the second fraction, and wherein the polymerization step for obtaining the second fraction is carried out in the presence of the first fraction.

10. A process for preparing a polypropylene composition according to claim 1, comprising the following steps:
    (i) polymerising propylene and 1-hexene, and optionally ethylene, in the presence of a single-site catalyst to obtain a fraction (a) having a content of 1-hexene of 2.5 to 12.0 wt %, and optionally a content of ethylene of 0.1 to 3.0 wt %, and having a melt flow rate $MFR_2$ of 0.1 to 100 g/10 min as determined at a temperature of 230° C. and a load of 2.16 kg, and
    (ii) polymerising ethylene, or ethylene and 1-octene, to obtain a fraction (b) having a melt flow rate $MFR_2$ of 0.05 to 30.0 g/10 min as determined at a temperature of 190° C. and a load of 2.16 kg and a density of 850 to 920 kg/m$^3$.

11. The process according to claim 10, wherein the polymerization step (i) is carried out in the absence of fraction (b) and the polymerization step (ii) is carried out in the absence of fraction (a), and fraction (a) and fraction (b) are mixed by compounding to obtain the blend.

12. A film comprising a polypropylene composition according to claim 1.

13. The film according to claim 12, wherein the film is a cast film.

* * * * *